US010037418B2

(12) United States Patent
Hamlin et al.

(10) Patent No.: US 10,037,418 B2
(45) Date of Patent: Jul. 31, 2018

(54) PRE-BOOT AUTHENTICATION CREDENTIAL SHARING SYSTEM

(71) Applicant: Dell Products L.P., Round Rock, TX (US)

(72) Inventors: Daniel Hamlin, Round Rock, TX (US); Brijesh Kumar Mishra, Murphy, TX (US); Minhaj Ahmed, Allen, TX (US)

(73) Assignee: Dell Products L.P., Round Rock, TX (US)

( * ) Notice: Subject to any disclaimer, the term of this patent is extended or adjusted under 35 U.S.C. 154(b) by 141 days.

(21) Appl. No.: 14/952,333

(22) Filed: Nov. 25, 2015

(65) Prior Publication Data

US 2017/0147801 A1 May 25, 2017

(51) Int. Cl.

*G06F 21/32* (2013.01)
*G06F 21/57* (2013.01)
*G06F 21/45* (2013.01)
*G06F 21/60* (2013.01)

(52) U.S. Cl.

CPC .............. *G06F 21/32* (2013.01); *G06F 21/45* (2013.01); *G06F 21/575* (2013.01); *G06F 21/602* (2013.01)

(58) Field of Classification Search

CPC ........ G06F 21/32; G06F 21/602; G06F 21/45; G06F 21/575

See application file for complete search history.

(56) References Cited

U.S. PATENT DOCUMENTS

2009/0319806 A1* 12/2009 Smith .................. G06F 21/575 713/193
2011/0138166 A1* 6/2011 Peszek ................. G06F 21/575 713/2
2012/0017271 A1* 1/2012 Smith .................. G06F 9/4401 726/19
2014/0325226 A1* 10/2014 Shiyafetdinov ....... G06F 21/602 713/171
2014/0366116 A1* 12/2014 Smith ..................... G06F 21/78 726/7
2015/0095638 A1* 4/2015 Smith .................. G06F 21/335 713/155
2017/0091438 A1* 3/2017 Raziel .................... G06F 21/40

* cited by examiner

*Primary Examiner* — Joseph P Hirl
*Assistant Examiner* — J. Brant Murphy
(74) *Attorney, Agent, or Firm* — Haynes and Boone, LLP

(57) ABSTRACT

A pre-boot authentication (PBA) credential sharing system includes a secure subsystem including an off-host processing system and a secure storage. A credential management application is coupled to the off-host processing system. A data protection engine is coupled to the off-host processing system and a PBA database. The data protection engine receives a notification from the off-host processor of the enrollment of an authentication credential in the secure storage by the credential management application, and provides PBA object information for association with the authentication credential to create a PBA object that is stored in the secure storage. Subsequently, while in a pre-boot environment, the data protection engine requests the PBA object from the secure storage, retrieves storage authentication information from the PBA database using the PBA object, and performs a pre-boot authentication process using the storage authentication information.

20 Claims, 6 Drawing Sheets

400

DATA PROTECTION ENGINE 210c
CREDENTIAL MANAGEMENT APPLICATION 210a
CREDENTIAL ENGINE 210b
OBJECT DIRECTORY 206a
OBJECT STORAGE 206b
REGISTER FOR CREDENTIAL ENROLLMENT CALLBACK 402
RETURN REGISTRATION RESULT 404
ENROLL CREDENTIAL 406
CREATE CREDENTIAL OBJECT 408
ADD CREDENTIAL OBJECT 410
RETURN POINTER TO CREDENTIAL OBJECT 412
STORE POINTER TO CREDENTIAL OBJECT 414
CREDENTIAL ENROLLMENT NOTIFICATION 416
RETURN POINTER TO CREDENTIAL OBJECT 418
REPORT CREDENTIAL ENROLLMENT RESULT 420

PRE-BOOT AUTHENTICATION CREDENTIAL SHARING SYSTEM

BACKGROUND

The present disclosure relates generally to information handling systems, and more particularly to a system for sharing credentials for pre-boot authentication.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems such as, for example, mobile computing systems, desktop computing systems, and/or other computing systems known in the art, include security systems that utilize credential authentication for gaining access to computing system functionality. For example, computing systems that utilize the MICROSOFT® WINDOWS® 10 operating system may include a biometric credential authentication system such as a fingerprint credential reader that operates with a fingerprint management application to allow a user to provide a finger scan for authentication to access the operating system. However, the use of such operating system biometric credential authentication systems can raise some issues. For example, the fingerprint management application provided in the WINDOWS® 10 operating system does not provide native support for pre-boot authentication, and thus conventional systems do not allow a fingerprint credential provided to the fingerprint management application for use in authenticating to the operating system to be used for authentication in a pre-boot environment.

In previous operating system versions (e.g., WINDOWS® 8), is was possible to provide a third party application to enroll and authenticate fingerprint credentials outside of the fingerprint management application that is native to the operating system, allowing those fingerprint credentials to be used for both operating system and pre-boot authentication. However, the fingerprint authentication application provided in the WINDOWS® 10 operating system has been designated by MICROSOFT® as the only application that may enroll and authenticate a fingerprint credential in a manner that enables full-featured authentication (e.g., authentication using Next Generation Credentials (NGC) proposed by MICRSOFT®). As such, pre-boot authentication (e.g., prior to the decryption and use of the storage system to complete the boot process) must be disregarded and all hardware security left to the operating system, which is undesirable for security reasons, an additional fingerprint credential must be provisioned for authentication in the pre-boot environment, which is undesirable for users who would like to provide a single finger scan to authenticate to their computing devices, or the computing system must operate with non-full-featured authentication (e.g., without the use of NGCs).

Accordingly, it would be desirable to provide a pre-boot authentication credential sharing system.

SUMMARY

According to one embodiment, an information handling system (IHS) includes a processing system; and a non-transitory memory system storing instructions that, when executed by the processing system, cause the processing to provide a data protection engine that is configured to: register with a secure subsystem for notifications about the enrollment of authentication credentials in a secure storage by a credential management application; receive a notification from an off-host processor of the enrollment of an authentication credential in the secure storage by the credential management application; provide PBA object information for association with the authentication credential to create a PBA object that is stored in the secure storage; receive a PBA object pointer for the PBA object in the secure storage; and provide the PBA object pointer for storage in a PBA database.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
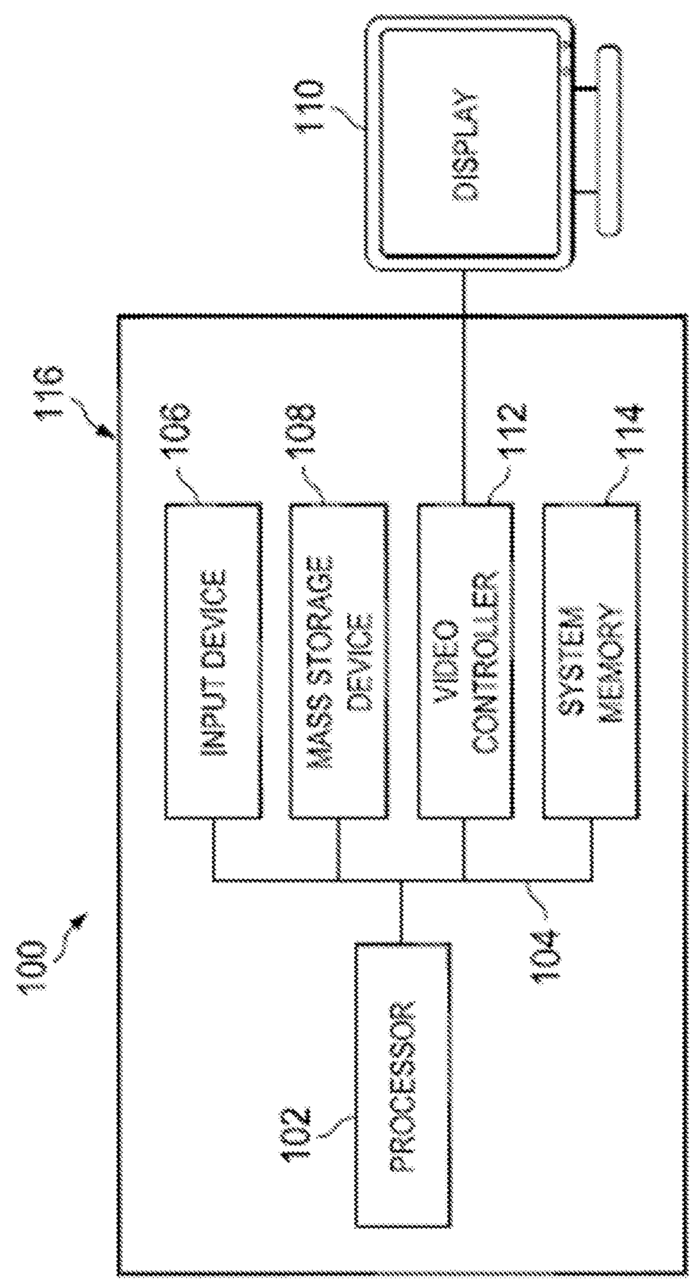
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
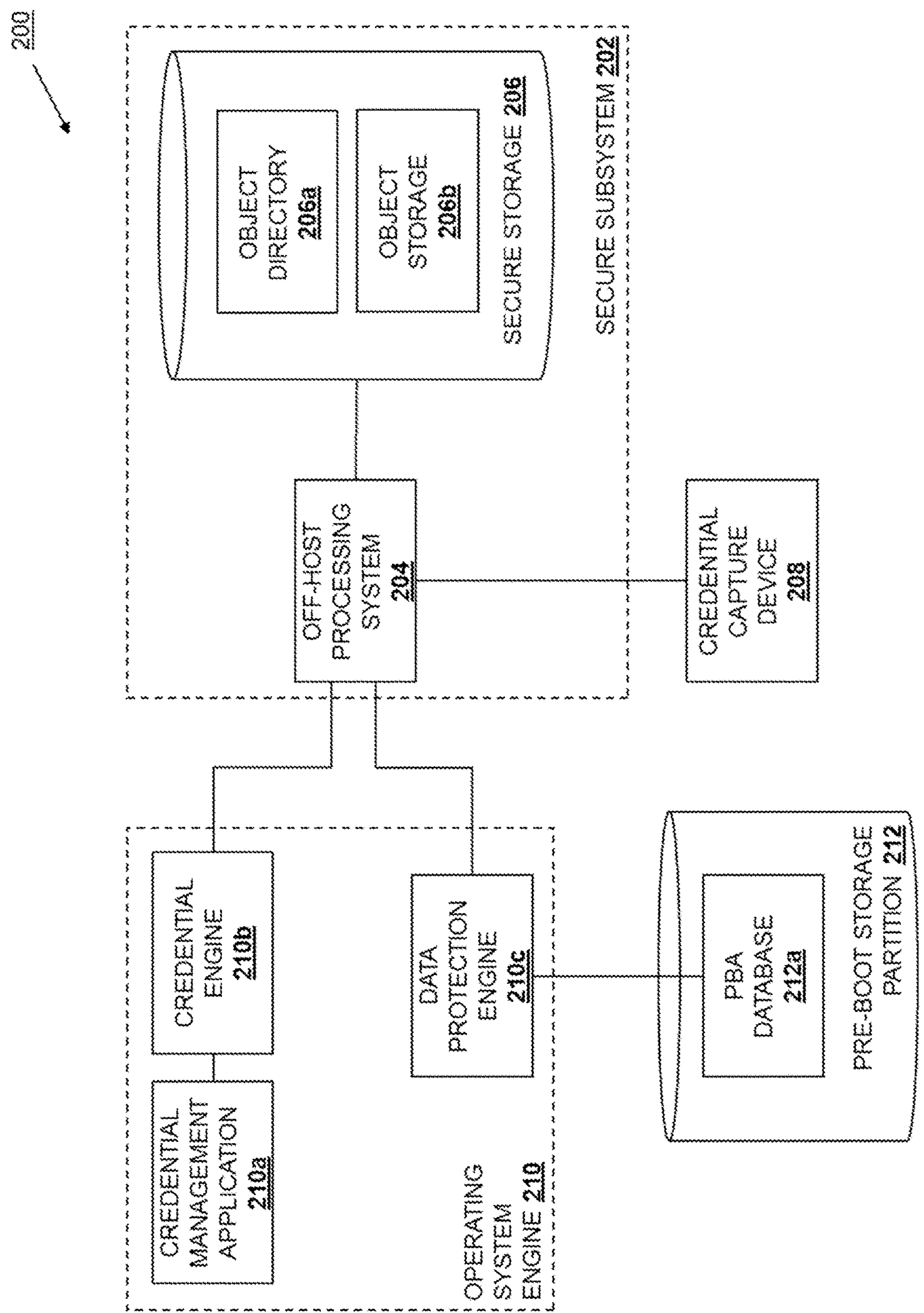
FIG. 2 is a schematic view illustrating an embodiment of a pre-boot authentication credential sharing system.

Referring now to FIG. 2, an embodiment of a pre-boot authentication (PBA) credential sharing system 200 is illustrated. In an embodiment, the PBA credential sharing system 200 may be provided in the IHS 100 discussed above with reference to FIG. 1, thus utilizing and/or providing some of the components of the IHS 100. As such, the PBA credential sharing system 200 may be included in mobile computing devices such as laptop/notebook computing devices, tablet computing devices, mobile phones, etc.; desktop computing devices, servers, switches, storage systems, and/or a variety of other computing devices known in the art that would benefit from pre-boot authentication using authentication credentials enrolled and authenticated by an OS-native credential management application. In the illustrated embodiment, the PBA credential sharing system 200 includes a secure subsystem 202. In an embodiment, the secure subsystem 202 may be provided by a CONTROLVAULT™ secure subsystem available from DELL® Inc. of Round Rock, Tex., United States. The secure subsystem 202 includes a plurality of components that operate to provide the functionality of the secure subsystems discussed below, only some of which are illustrated in FIG. 2. For example, an off-host processing system 204 that is separate from a host processing system (which may be utilized to provide the engines discussed below) is included in the secure subsystem 202 and coupled to a secure storage 206 that is accessible by the off-host processing system 204 and that, in the illustrated embodiment, stores an object directory 206a and an object storage 206b.

In a specific embodiment the object directory 206a and the object storage 206b may operate as follows with regard to the creation, storage, and management of objects in the object storage 206. Applications provided in an operating system may create an object for the object storage 206b that includes a plurality of sections: an attributes section that describes the object and its type, an authorization section that lists the possible authorization types that can manipulate (i.e., read, write, update, etc.) the object, and a value section that provides the data to be stored as the object (e.g., credential data such as the biometric credential data (e.g., fingerprint templates) or an encryption key utilized by an application). As discussed below, upon creation and storage of an object in object storage 206b, the secure subsystem 202 stores a pointer (also known as a "handle") to that object in the object directory 206a and may provide that pointer to calling/requesting applications. In a specific embodiment, the object directory 206a may be indexed by a combination of an identifier for the application (e.g., an "AppID") and an identifier for the user (e.g., a "UserID") that may be used to provide the pointer to the stored object. That AppID and UserID may then be provided to applications that provide an authenticated call for their associated object.

As also discussed below, any application may obtain a list of objects associated with an AppID and UserID in the object storage 206b by sending a request to the secure subsystem 202, which will return a list of pointers in the object directory 206a to objects associated with that combination of AppID and UserID. As long as the calling application has knowledge of the AppID and UserID, the list of pointers can be obtained, and the calling application does not have to be the same application that caused the object to be stored. As also discussed below, the secure subsystem 202 allows for an application provided in and/or by the operating system to register for callbacks during some events, which may include credential enrollment, credential deletion, credential update, Certificate-Less SigneCryption (CLSC) identifier reads, and/or other events known in the art. When a registered event occurs, the secure subsystem 202 may generate an interrupt to a driver and then call the associated applications that registered for the callback. While a specific secure subsystem 202 is illustrated and described herein, one of skill in the art in possession of the present disclosure will recognize that a wide variety of secure subsystems may be provided in the PBA credential sharing system 200 while remaining within the scope of the present disclosure.

The PBA credential sharing system 200 includes a credential capture device 208 that is coupled to the off-host processing system 204 in the secure subsystem 202. In an embodiment, the credential capture device 208 may be an input device on a computing system that provides the PBA credential sharing system 200 such as, for example, a keyboard that is used to provide alphanumeric authentication credentials. In another embodiment, the credential capture device 208 may be biometric credential device on a computing system that provides the PBA credential sharing system 200 such as, for example, a fingerprint reader, a iris (eye) reader, a image capturing and recognition (e.g., face recognition) system, and/or other biometric credential devices known in the art. While a few examples have been provided, one of skill in the art in possession of the present disclosure will recognize that any of a variety of credential capture devices will fall within the scope of the present disclosure.

The PBA credential sharing system 200 may also include a host processing system (not illustrated, but which may include the processor 102 discussed above with reference to FIG. 1) and host memory system (not illustrated, but which may include the system memory 114 discussed above with reference to FIG. 1) that includes instructions that, when executed by the host processing system, cause the host processing system to provide an operating system engine 210 that is configured to perform the functions (e.g., provide an runtime/operating system environment) of the operating system engines discussed below. In a specific embodiment, the operating system engine 210 may be configured to provide the WINDOWS® 10 operating system available from MICROSOFT® corporation of Redmond, Wash., United States. However, one of skill in the art in possession of the present disclosure will recognize that other operating systems that include native credential management applications that are the only applications enabled to enroll and authenticate credentials will benefit from the teachings of the present disclosure and thus will fall within its scope.

A credential management application 210*a* (e.g., provided by the host processing system and memory system similarly to the operating system engine) and a credential engine 210*a* (e.g., provided by the host processing system and memory system similarly to the operating system engine) are each provided by the operating system engine 210 (i.e., provided in an operating system environment provided by the operating system engine 210) and coupled to the off-host processing system 204 in the secure subsystem 202 (e.g., via a coupling between the host processing system and the off-host processing system 204). In a specific embodiment, the credential management application 210*a* may be provided by a Fingerprint Management Application (FMA) provided with the WINDOWS® 10 operating system (OS) by MICROSOFT® corporation of Redmond, Wash., United States, and the credential engine 210*b* may include components of the WINDOWS® Biometric Framework (WBF) that operates to enable credential management communications between the FMA and the secure subsystem 202. As discussed above, the FMA provided in the WINDOWS® 10 operating system is an OS-native native application that allows users to enroll biometric templates for authentication, and no third party FMA is allowed to be enabled by outside device manufacturers, thus requiring any biometric authentication to leverage the OS-native FMA.

Username and passwords are the conventional model for which users have authenticated to and within computing devices. The user typically provides these two data points and the information is hashed together for authorization at a central authority so that access may be granted. This data is susceptible to many different types of attacks (replay, dictionary, brute force, etc.). The Next Generation Credential (NGC) proposed by MICROSOFT® corporation of Redmond, Wash., United States includes a new method for providing a credential to authenticate the user to the computing device and any network resources. The NGC is created by cryptographically tying a user credential (e.g., a personal identification number (PIN), biometric credential, etc.) to the platform (e.g., through a Trusted Platform Module (TPM)), and storing that credential with an Identity Provider so that it may be provided to any requesting applications for user authentication during runtime.

The WBF (e.g., which provides at least a portion of the credential engine 210*b* in some embodiments of the present disclosure) provides a method of interacting with biometric devices (e.g., the credential capturing device 208) and includes components such as WinBio services that interfaces with calling applications to provide access to biometric data and to perform biometric functions. The credential engine 210*b* may also include a sensor adapter that provides direction to the physical sensor for data acquisition, an engine adapter that conducts image manipulation and comparison functions, a storage adapter that manages databases of enrolled users and reference templates, and a WINDOWS® Biometric Device Interface (WBDI) provided by a driver that interfaces to engage with biometric devices.

A data protection engine 210*c* (e.g., provided by the host processing system and memory system similarly to the operating system engine) may be provided by the operating system engine 210 (i.e., provided in an operating system environment provided by the operating system engine 210) and coupled to the off-host processing system 204 in the secure subsystem 202 (e.g., via a coupling between the host processing system and the off-host processing system 204). In addition, the data protection engine 210*c* may also be provided in a pre-boot environment as well by, for example, running the data protection engine 210*c* in the host operating system context while the data protection engine 210*c* is stored (at rest) within the unencrypted portion of the memory system. In a specific embodiment, the data protection engine 210*c* may be provided by a DELL® Data Protection (DPP) application provided by DELL® Inc. of Round Rock, Tex., United States. As discussed below, the data protection engine 210*c* may provide a secure pre-boot operating environment which requires a user to authenticate to the computing device before a storage system on the computing device is made accessible such that a boot process may be completed. The PBA credential sharing system 200 also includes a pre-boot storage partition 212 (e.g., located on a partition of a storage system of the computing device) upon which the data protection engine 210*c* maintains a PBA database 212*a* that includes user credentials and keys associated with users, as well as the methods to derive encryption keys that may be used decrypt or unlock the storage system on the computing device so that the computing device may complete a boot process. The pre-boot authentication processes including the encryption/decryption methodologies referenced above are outside the scope of this disclosure and thus not described in detail herein.

The data protection engine 210*c* may provide PBA Host Services that are the data protection engine application/services that run in the operating system environment provided by the operating system engine 210*c*, and that manage the pre-boot environment by, for example, initializing encryption, disabling encryption, adding/removing/updating users and credentials for authentication, etc. The PBA database 212*a* may include a plurality of tables such as, for example, a user private key table that contains keys that are encrypted with a derived key from a user's presented credential (e.g., password, fingerprint, smartcard, etc.), and a unique user root key entry into the user private key table for each enrolled authentication credential. The PBA database 212*a* may also include a user unique key (UUK) table that contains user unique keys that may be used for single sign on (SSO) functionality, which may be encrypted by the user's root key as decrypted from the user root key table, and a unique UUK entry for each enrolled credential. The PBA database 212*a* may also include an Opal key table that contains the entries including the Opal key that is used for self-encrypting drive decryption, which may be encrypted by the user's root key as decrypted from the user root key table, and a unique Opal key entry for each enrolled credential. The PBA database 2112*a* is accessible to the PBA application provided by the data protection engine 210*c* and manages the user's authentication to both the storage system unlock key and the SSO key for operating system login. The user's enrolled credentials may be used to encrypt the user's root key, which may be used to encrypt a copy of the storage system unlock key (e.g., an Opal key for a self-encrypting drive) and user unique key (e.g., used for DigitalPersonal SSO).

As discussed below, the data protection engine 210*c* may provide a user interface for the user to authenticate their identity via their enrolled password. The password may be used to derive a root key which is then used to unwrap the user's SSO token and the storage system unlock key. The user's SSO token may then be placed on the unlocked storage system partition for SSO function. Upon operating system login, a service may launch and detect the SSO token on the storage system partition and provide the included information for authentication.

Figure 3:
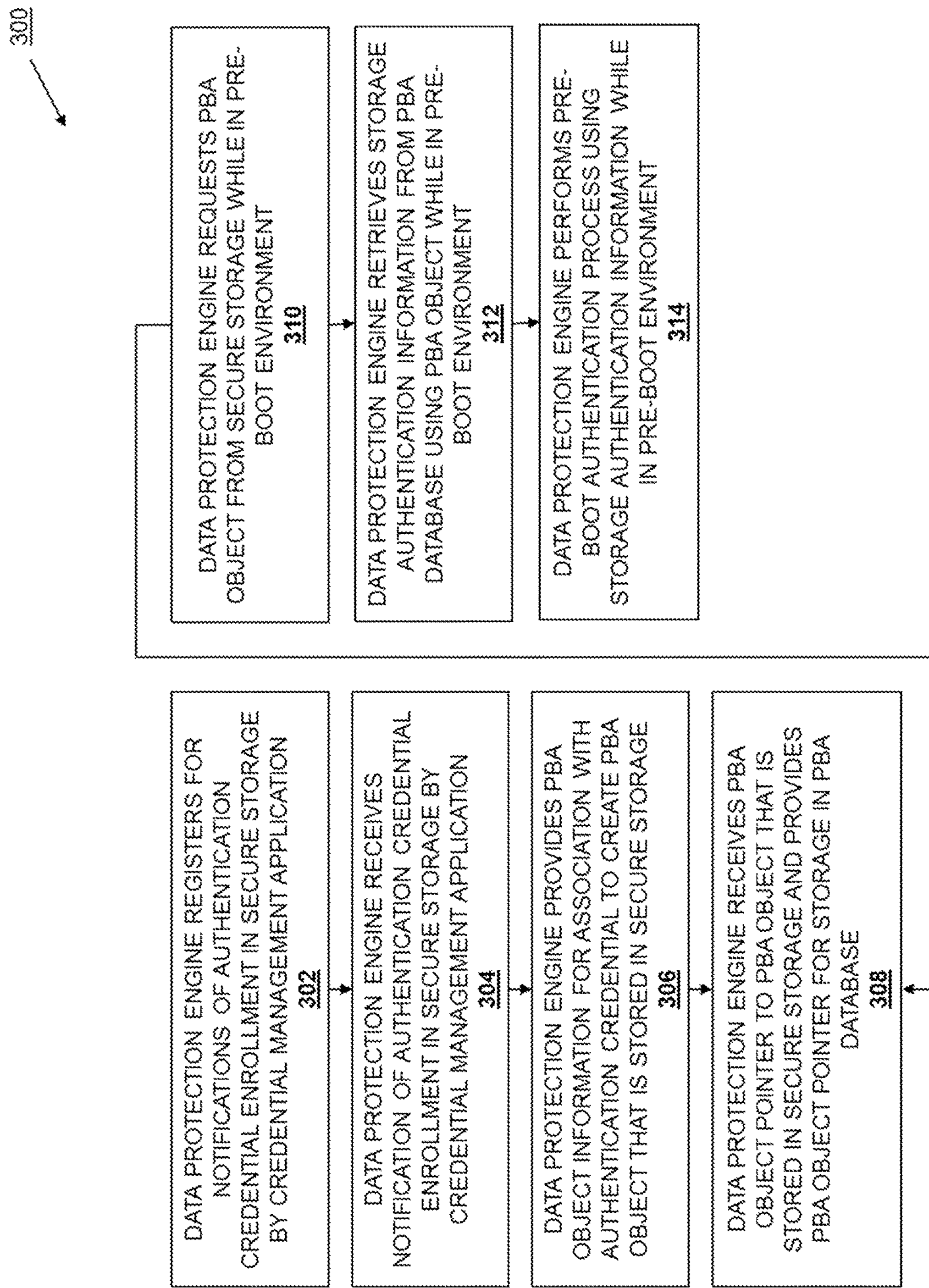
FIG. 3 is a flow chart illustrating an embodiment of a method for sharing credentials for pre-boot authentication.

Referring now to FIG. 3, and with reference to FIGS. 4, 5, and 6 below, a method 300 for sharing credentials for pre-boot authentication is illustrated. As discussed in further detail below, a PBA provisioning application may be provided within an operating system environment that will register for callback notifications when an authentication credential is enrolled into a secure subsystem by an OS-native credential enrollment application. Enrollment of an authentication credential into the secure subsystem includes the secure subsystem storing an object that includes a credential template (e.g., a fingerprint template) and returning an object pointer to that object to the credential engine/management application that enrolled that authentication credential. In response to a notification of enrolled authentication credentials, the PBA provisioning application will provide PBA object information for association with the enrolled credential to create a PBA object, receive/retrieve a PBA object pointer to the PBA object in the secure subsystem, and add the PBA object pointer to a PBA database and a credential pointer for the enrolled authentication credential to the authorization list for the PBA object. The PBA object then may be used to unlock a PBA database (e.g., when a fingerprint scan is authenticated) to decrypt a storage system in a pre-boot environment such that a boot process may be performed. As such, an authentication credential enrolled by an OS-native credential management application may be "shared" with a PBA subsystem for use in providing authentication in a pre-boot environment.

Figure 4:
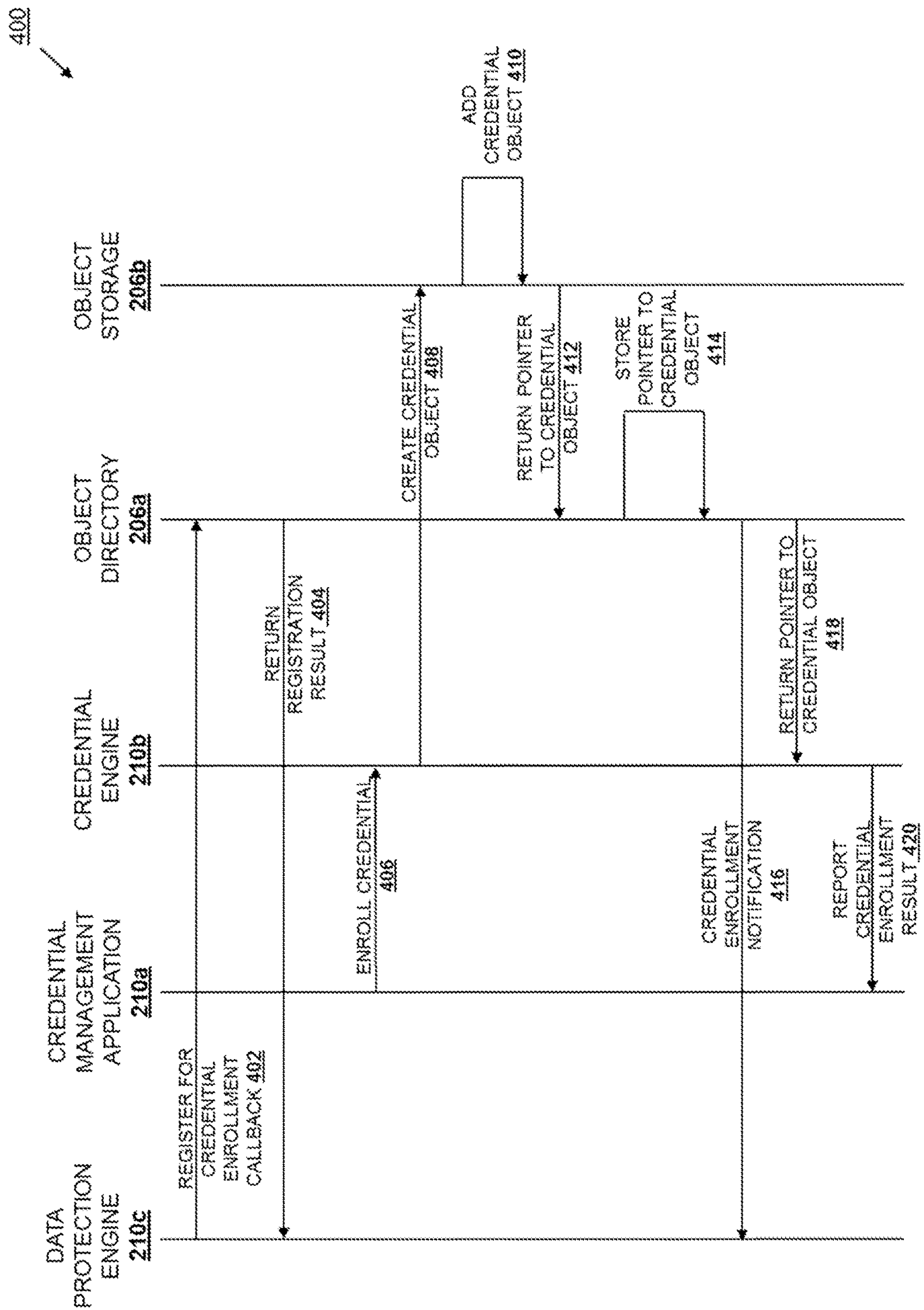
FIG. 4 is a flow diagram illustrating the pre-boot authentication credential sharing system of FIG. 2 operating according to the method of FIG. 3.

With reference to the flow diagram 400 in FIG. 4, the method 300 begins at block 302 where a data protection engine registers for notifications of authentication credential enrollment in a secure storage by a credential management application. In an embodiment of block 302, the data protection engine 210*c* may perform action 402 by registering for a credential enrollment callback with the object directory 206*a*. For example, the data protection engine 210*c* may perform a registration process with the secure subsystem 202 in order to be notified of changes in the object directory that result from a credential enrollment, credential update, credential deletion, and/or other changes known in the art that modify the object directory. In response, the secure subsystem 202 may perform action 404 by returning a registration result to the data protection engine 210*c* (i.e., that the credential enrollment callback has been successfully registered). While the credential enrollment callback notifications may optimize runtime enablement of the functionality discussed below, in some embodiments of the method 300, the registration for credential enrollment callback may be skipped.

The method 300 then proceeds to block 304 where the data protection engine receives notification of authentication credential enrollment in the secure storage by the credential management application. In an embodiment, the credential management application 210*a* may perform action 406 to enroll a credential, and the credential engine 210*b* may perform action 408 to instruct the secure subsystem 202 to create a credential object in the object storage 206*b* that may be associated with the authentication of a user (e.g., the authentication of the credential object may be used as an input and compared to an authentication list for the PBA object or other secret). In response, the secure subsystem 202 may perform action 410 to add a credential object 410 to the object storage 206*b*, and perform action 412 to return a pointer to the credential object to the object directory 206*a*. The secure subsystem 202 may also perform action 414 to store the pointer to the credential object in the object directory 206*a*. The secure subsystem 202 (e.g., the off-host processing system 202*a*) may be monitoring the object directory 206*a* for changes (i.e., the addition of the pointer to the credential object) and, in response to a change, reference the registered callback notifications to perform action 416 and provide a credential enrollment notification to the data protection engine 210*c*. In addition, the secure subsystem 202 may perform action 418 to return a pointer to the credential object to the credential engine 210*b*, which may perform action 420 to report the credential enrollment result to the credential management application 210*a* (i.e., a successful credential enrollment).

As such, in specific embodiments, WBF components that provide the credential engine 210*b* may manage creation of a fingerprint template within the secure subsystem 202 and provide appropriate messages to the FMA/credential management engine 210*a*. Upon completion and generation of a reference template, the secure subsystem 202 may create an object and associate that object with the WBF components as an AppID and a UserID of the provisioning user. These IDs then be used to create an entry to the object directory 206*a* and pointer to that entry, which may be provided to the FMA/credential management engine 210*a* through the credential engine 210*b*.

Figure 5:
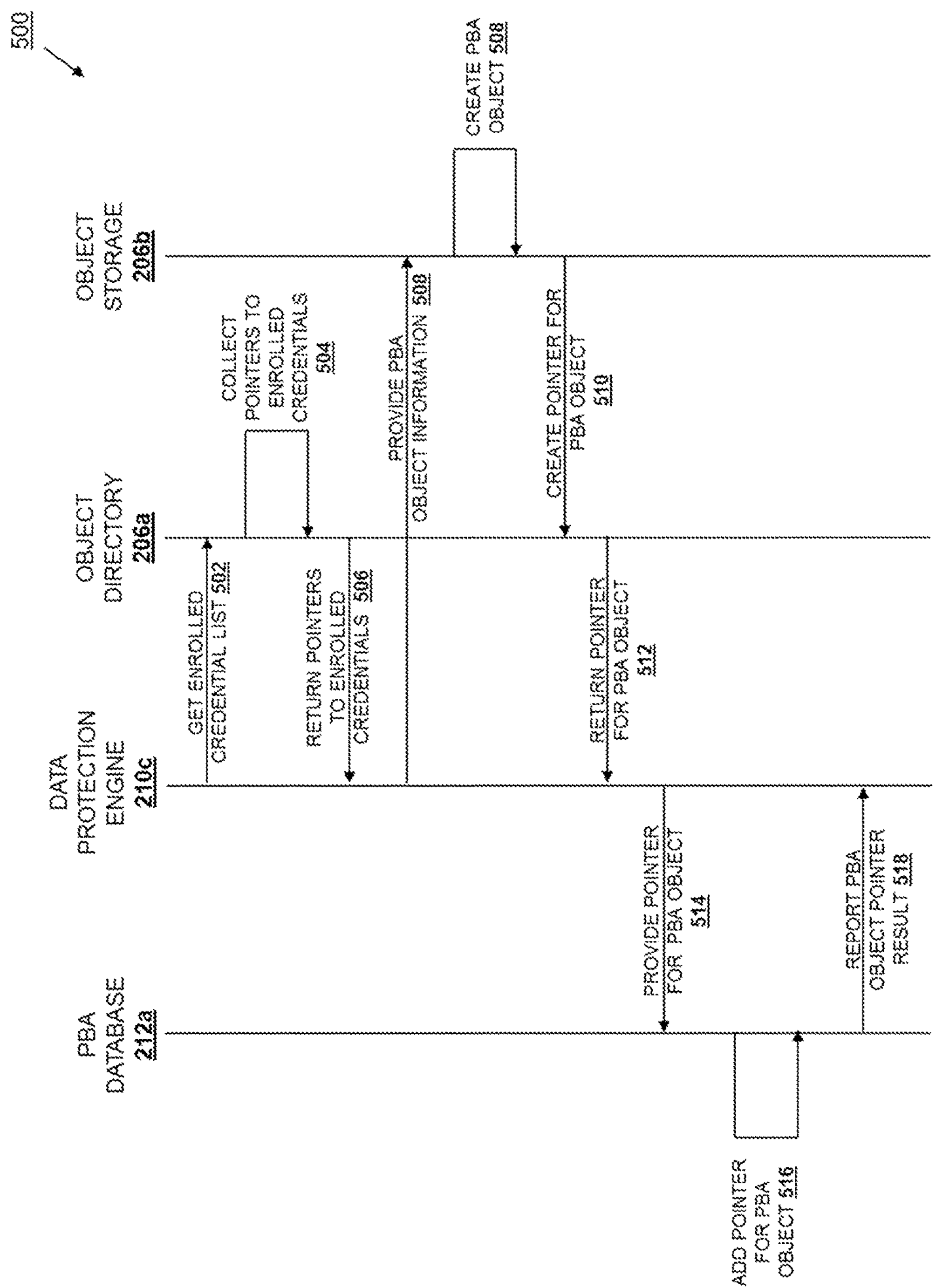
FIG. 5 is a flow diagram illustrating the pre-boot authentication credential sharing system of FIG. 2 operating according to the method of FIG. 3.

With reference to the flow diagram 500 in FIG. 5, the method 300 then proceeds to block 306 where the data protection engine provides PBA object information for association with the authentication credential to create a PBA object that is stored in the secure storage. In some embodiments of block 306, the data protection engine 210*c* may perform action 502 to get an enrolled credential list and, in response, the secure subsystem 202 may perform action 504 to collect pointers of enrolled credentials from the object directory 206*a*, and perform action 506 to return the pointers to the enrolled credentials to the data protection engine 210*c*. For example, the data protection engine 210*c* provided in the operating system environment may request pointers for all centrally known fingerprints that are stored in the object storage 206*b* in association with a UserID and AppID, and the secure subsystem 202 may return pointers associated with the enrolled templates for that UserID/AppID combination. The data protection engine 210*c* may then provide that UserID and AppID, along with any other passcode authorization information, and generate PBA object information that may include a list of authorization options to include in the authorization field for the PBA object that will be created as discussed below. The secure subsystem 202 receives the PBA object information, and performs action 508 to create a PBA object in the object storage 206*b*.

The method 300 then proceeds to block 308 where the data protection engine receives a PBA object pointer to a PBA object that is stored in the secure storage and provides the PBA object pointer for storage in a PBA database. In an embodiment of block 308, in response to the creation of the PBA object in the object storage 206*b*, the secure subsystem 202 may perform action 510 to create a PBA object pointer to that PBA object as an entry into the object directory 206*a*, and perform action 512 to return the PBA object pointer for that PBA object to the data protection engine 210*c*. In response to receiving the PBA object pointer, the data protection engine 210*c* may perform action 514 to provide the PBA object pointer for the PBA object to the PBA database 212*a*. In response, action 516 to add the PBA object pointer for the PBA object to the PBA database 212*a* is performed, and action 518 is performed to report the PBA object pointer result to the data protection engine 210*c* (e.g., successful storage of the PBA object pointer in the PBA database 212*a*). In some embodiments, other actions between the data protection engine 210*c* and the PBA database 212*a* may be performed such as, for example, using the PBA object pointer with other relevant information (e.g., AppID, UserID, etc.) to generate a PBA encryption key. For example, a generated PBA encryption key may be used with a storage device based encryption environment by loading the PBA encryption key into storage device firmware for hardware encryption, or by using the PBA encryption key to decrypt a storage device via software encryption.

Figure 6:
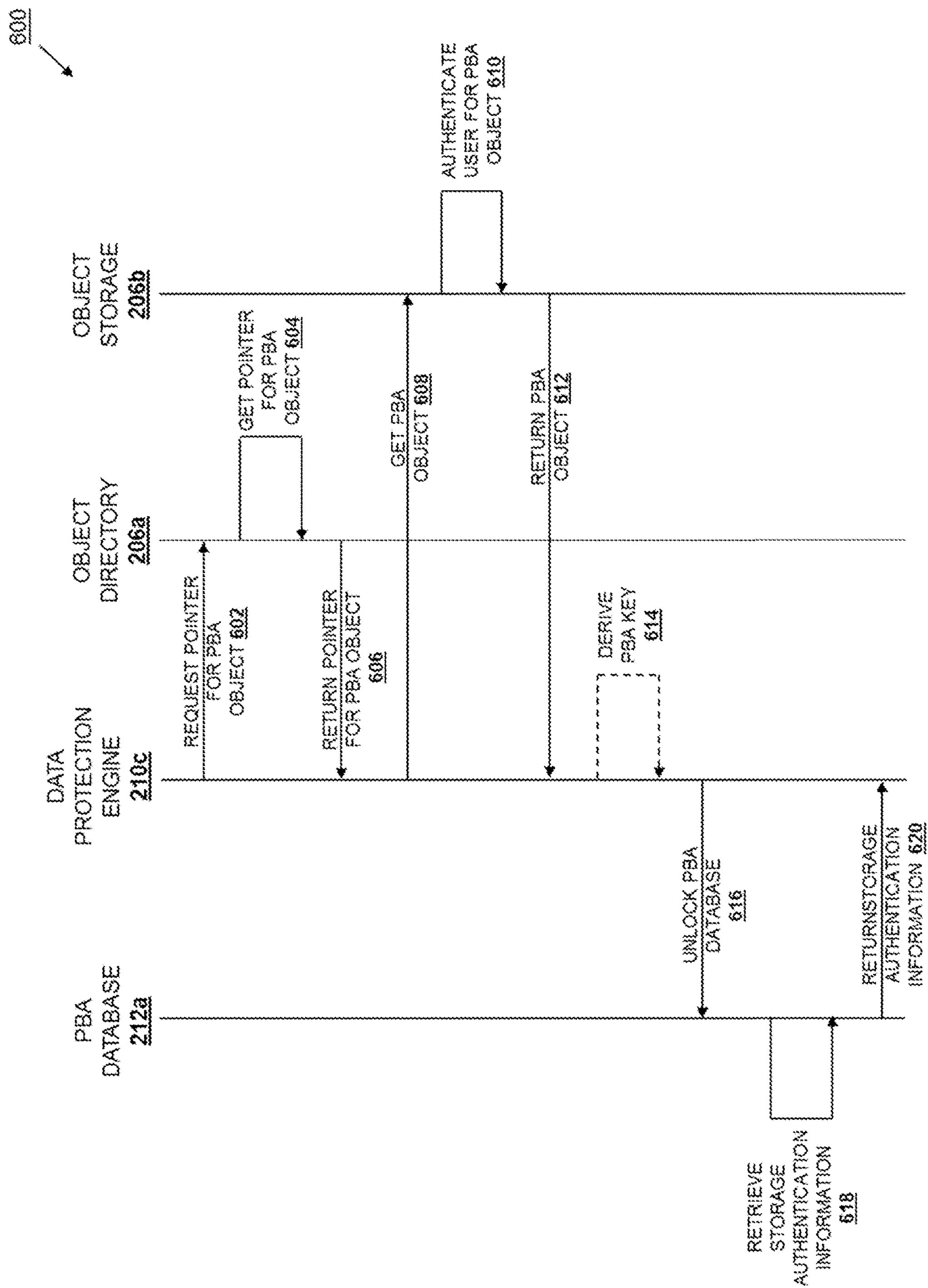
FIG. 6 is a flow diagram illustrating the pre-boot authentication credential sharing system of FIG. 2 operating according to the method of FIG. 3.

With reference to the flow diagram 600 of FIG. 6, the method 300 then proceeds to block 310 where the data protection engine requests the PBA object from the secure storage while in a pre-boot environment. In an embodiment, the computing system utilizing the pre-boot authentication credential sharing system 200 may power up, restart, and/or other initialize such that it enters a pre-boot environment that is provided prior to performing a boot process. The pre-boot environment of the present disclosure requires user authentication in order to allow access to a storage system that allows the boot process to be completed so that the computing system may enter a runtime/operating system environment. In some embodiments, in response to the initialization of the computing device to enter the pre-boot environment, the data protection engine 210*c* may perform action 602 to request a PBA object pointer for a PBA object from the secure subsystem 202, which may perform action 604 to get the PBA object pointer for the PBA object from the object directory 206*a*, as well as action 606 to return the PBA object pointer for the PBA object to the data protection engine 606. For example, actions 602, 604, and 606 may be performed when the PBA object pointer for the PBA object was not stored in the PBA database 212*a* as discussed above. However, in embodiments where the PBA object pointer is stored in the PBA database 212*a*, actions 602, 604, and 606 may be skipped and the data protection engine 210*c* may retrieve the PBA object pointer from the PBA database 212*a*.

In an embodiment, the data protection engine 210*a* may perform action 608 to get the PBA object from the object storage 206*b*. In a specific example, a PBA application provided by the data protection engine 210*a* in the pre-boot environment (e.g., not provided with the operating system engine 210) is utilized for providing User Interface (UI) elements to the user in the pre-boot environment. The PBA application provided by the data protection engine 210*a* may retrieve the PBA object pointer for a UserID and AppID combination for the PBA application, interrogate the authorization requirements (e.g., read and interpret the authorization options associated with the PBA object to determine how to access the PBA object), and prompt the user to authenticate their finger such that a finger scan is received. That finger scan data, as well as other information such as the UserID and AppID, may be provided as part of action 608 to get the PBA object from the object storage 206*b*. The secure subsystem 202 may then perform action 610 by authenticating the user for the PBA object. For example, the off-host processing system 204 may compare the finger scan received from the data protection engine 210*a* and the enrolled authentication credential stored as a credential object in the object storage 610 to authenticate the user for the PBA object. Upon authentication, the secure subsystem 202 may perform action 612 to return the PBA object (which is associated with the UserID/AppID of the PBA application provided by the data protection engine 210*c*) to the data protection engine 210*c*.

The method 300 then proceeds to block 312 where the data protection engine retrieves storage authentication information from the PBA database using the PBA object while in the pre-boot environment. In an embodiment, the data protection engine 210*c* may perform optional action 614 and use the PBA object to derive a PBA key. However, in some embodiments, optional action 614 may be skipped. The data protection engine 210*c* may then perform action 616 to unlock the PBA database 212*a* using, for example, the PBA object (e.g., when optional action 614 is skipped) or the PBA key (e.g., when optional action 614 is performed). In response to unlocking the PBA database 212*a*, action 618 may be performed to retrieve storage authentication information from the PBA database 212*a*, and action 620 may be performed to return that storage authentication information to the data protection engine 210*c*. The method 300 then proceeds to block 314 where the data protection engine performs a pre-boot authentication process using the storage authentication information while in the pre-boot environment. In an embodiment, the data protection engine 210*c* may then use the storage authentication information to decrypt one or more storage drives in a storage system in the computing system such that the boot information on the storage system is accessible to complete a boot process such that the computing system may enter a runtime/operating system environment. In some examples, a secret stored within the PBA object may be used to verify and/or retrieve a different object from the PBA database such that the PBA object is a key to release another secret stored in the PBA database.

Thus, systems and methods have been described that provide for the "sharing" of an authentication credential that is enrolled and authenticated by an OS-native credential management application, with a pre-boot authentication subsystem in order to allow that same authentication credential to be used to authenticate a user in a pre-boot environment such that a booting process may be performed. Such systems and methods enable a user to perform a single authentication credential provisioning action that will result in their authentication in a pre-boot environment that will allow their computing system to complete a boot process, and well as their authentication in an operating system environment that will provide access to the operating system on their computing device. This is enabled by providing a non-PBA aware credential enrollment application that creates and provisions authentication credentials to a secure subsystem, and allowing that authentication credential in the secure subsystem to be utilized for pre-boot-authentication functions.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method for sharing credentials for pre-boot authentication (PBA), comprising:

receiving, by a data protection engine provided by a host processor while in an operating system environment during a first time period, a notification from an off-host processor of an enrollment of an authentication credential in a secure storage by a credential management application that is native to an operating system;

providing, by the data protection engine, PBA object information for association with the authentication credential to create a PBA object that is stored in the secure storage;

requesting, by the data protection engine while in a pre-boot environment that is provided subsequent to the operating system environment during the first time period, the PBA object from the secure storage;

retrieving, by the data protection engine while in the pre-boot environment, storage authentication information from a PBA database using the PBA object; and performing, by the data protection engine while in the pre-boot environment, a pre-boot authentication process using the storage authentication information in order to complete a boot process; and performing, by the data protection engine, an operating system authentication process using the storage authentication information in order to enter the operating system environment subsequent to the pre-boot environment and during a second time period that is subsequent to the first time period.

2. The method of claim 1, wherein the data protection engine is provided, at least in part, with the operating system that provides the credential management application.

3. The method of claim 1, wherein the authentication credential is a biometric authentication credential.

4. The method of claim 1, further comprising:

registering, by the data protection engine, with a secure subsystem for notifications about the enrollment of the authentication credential in the secure storage by the credential management application.

5. The method of claim 1, wherein the pre-boot authentication process includes decrypting a storage drive.

6. The method of claim 1, further comprising:

deriving, by the data protection engine, at least one PBA key using the PBA object information; and retrieving, by the data protection engine, the PBA object information from the PBA database using the at least one PBA key.

7. The method of claim 1, wherein the PBA object information includes an authorization list for the PBA object.

8. A pre-boot authentication (PBA) credential sharing system, comprising:

a secure subsystem including an off-host processing system and a secure storage;

an operating system engine that is coupled to the off-host processing system and that includes a credential management application that is native to the operating system engine; and a data protection engine that is provided by a host processing system and that is coupled to the off-host processing system and a PBA database, wherein the data protection engine is configured to:

receive a notification from the off-host processing system of an enrollment of an authentication credential in the secure storage by the credential management application while in an operating system environment during a first time period;

provide PBA object information for association with the authentication credential to create a PBA object that is stored in the secure storage;

request, while in a pre-boot environment that is provided subsequent to the operating system environment during the first time period, the PBA object from the secure storage;

retrieve, while in the pre-boot environment, storage authentication information from the PBA database using the PBA object;

perform, while in the pre-boot environment, a pre-boot authentication process using the storage authentication information in order to complete a boot process; and perform an operating system authentication process using the storage authentication information in order to enter the operating system environment subsequent to the pre-boot environment and during a second time period that is subsequent to the first time period.

9. The pre-boot authentication credential sharing system of claim 8, wherein the data protection engine is provided, at least in part, with the operating system engine.

10. The pre-boot authentication credential sharing system of claim 8, wherein the authentication credential is a biometric authentication credential.

11. The pre-boot authentication credential sharing system of claim 8, wherein the data protection engine is configured to:

register with the secure subsystem for notifications about the enrollment of the authentication credential in the secure storage by the credential management application.

12. The pre-boot authentication credential sharing system of claim 8, wherein the pre-boot authentication process includes decrypting a storage drive.

13. The pre-boot authentication credential sharing system of claim 8, wherein the data protection engine is configured to:

derive at least one PBA key using the PBA object information; and retrieve the PBA object information from the PBA database using the at least one PBA key.

14. An information handling system (IHS), comprising:

a host processing system; and a non-transitory memory system storing instructions that, when executed by the host processing system, cause the host processing system to provide a data protection engine that is configured to:

receive a notification from an off-host processing system of an enrollment of an authentication credential in a secure storage by a credential management application that is native to an operating system while in an operating system environment during a first time period;

provide PBA object information for association with the authentication credential to create a PBA object that is stored in the secure storage;

request, while in a pre-boot environment that is provided subsequent to the operating system environment during the first time period, the PBA object from the secure storage;

retrieve, while in the ore-boot environment, storage authentication information from a PBA database using the PBA obiect;

perform, while in the pre-boot environment, a pre-boot authentication process using the storage authentication information in order to complete a boot process; and perform an operating system authentication process using the storage authentication information in order to enter the operating system environment subsequent to the pre-boot environment and during a second time period that is subsequent to the first time period.

15. The IHS of claim 14, wherein the data protection engine is provided, at least in part, with the operating system that provides the credential management application.

16. The IHS of claim 14, wherein the authentication credential is a biometric authentication credential.

17. The IHS of claim 14, wherein the data protection engine is configured to:

register with a secure subsystem that includes the off-host processing system and the secure storage for notifications about enrollment of authentication credentials in the secure storage by the credential management application that is native to the operating system.

18. The IHS of claim 14, wherein the pre-boot authentication process includes decrypting a storage drive.

19. The IHS of claim 14, wherein the data protection engine is configured to:

derive at least one PBA key using the PBA object information; and retrieve the PBA object information from the PBA database using the at least one PBA key.

20. The IHS of claim 7, wherein the PBA object information includes an authorization list for the PBA object.

* * * * *